United States Patent [19]

Joyner

[11] Patent Number: 4,522,608
[45] Date of Patent: Jun. 11, 1985

[54] FLANGE YOKE

[75] Inventor: Robert G. Joyner, Toledo, Ohio

[73] Assignee: Dana Corporation, Toledo, Ohio

[21] Appl. No.: 405,978

[22] Filed: Aug. 9, 1982

[51] Int. Cl.³ ............................................. F16D 3/26
[52] U.S. Cl. ..................................... 464/134; 403/57
[58] Field of Search ...................... 29/527.6, 557, 558; 403/57, 58; 408/2; 464/134, 135, 902

[56] References Cited

U.S. PATENT DOCUMENTS

| 3,861,817 | 1/1975 | Muller | 408/2 X |
| 3,932,053 | 1/1976 | Hack | 29/558 X |
| 4,192,153 | 3/1980 | Fisher | 464/134 |

FOREIGN PATENT DOCUMENTS

| 1301471 | 7/1961 | France | 403/57 |
| 457418 | 11/1936 | United Kingdom | 464/135 |

Primary Examiner—Stuart S. Levy
Assistant Examiner—Daniel P. Stodola
Attorney, Agent, or Firm—Robert M. Leonardi

[57] ABSTRACT

A heavy duty cast iron flange yoke (110) has two lugs (116) for receiving a journal cross and a flange (112) having front (111) and back (113) faces. The back face (113) includes balance pads (141) in which may be drilled balance holes (140). The balance pads are generally underneath the lugs (116) and the holes (140) are radially inside the radially outer surface (131) of the lugs.

6 Claims, 5 Drawing Figures 4,522,608

FLANGE YOKE

BACKGROUND OF THE INVENTION

This invention relates to universal joint assemblies in general, and more specifically to flange yokes. Universal joint assemblies, particuarly those used in vehicle drivelines, are designed for rapid rotation under substantial torsional loads. As is well known in the art, universal joint assembly components, such as yoke members, must be carefully balanced to perform adequately. Balancing is especially important for components such as flange yokes, which have a relatively high proportion of mass positioned a substantial distance from their axes of rotation.

Individual universal joint components such as flange yokes are balanced prior to their assembly. A typical balancing process for yokes includes drilling holes in the finished yoke to remove excessive mass from its "heavy" side. A typical practice in balancing flange yokes includes drilling several shallow balance holes on the back face of the flange near its outer periphery. The traditional practice has been to move the balance holes radially outwardly to the periphery of the flange and the farthest away from the center of rotation of the flange to be most effective.

Several problems exist with the typical flange yoke balancing techniques. The depth of balance holes is limited by the flange thickness, and the balance hole diameter must be small enough to avoid the companion flange pilot ring on the back face of the flange. Often, one or two small diameter, shallow balance holes do not remove sufficient mass from the heavy side of the flange, and many more holes must be drilled around the periphery of the flange in areas where they are not most effective.

With the increased use of lighter weight, power density materials, such as cast iron, it is often necessary to remove a greater volume of material in the balancing process, i.e., to provide larger balance holes. Manufacturers face potential problems in changing to such lower density materials because there is little room to remove additional weight. These problems can be alleviated by using more care in the earlier manufacturing steps, such as casting and machining, to hold closer tolerances than previously necessary prior to balancing. Smaller tolerances, of course, require additional effort and expense.

SUMMARY OF THE INVENTION

The present invention is a flange yoke capable of accepting balance holes at an optimum location. The optimum location accommodates larger diameter and deeper balance holes. Because of the effectiveness of the present invention, the tolerances held in the earlier steps of the manufacturing process do not have to be tightened and may even be relaxed when working with light weight materials.

The present invention is a flange yoke having a front face from which two lugs axially extend, each containing a bearing cross hole. The back face of the flange includes a balance drill hole which is positioned underneath one of the lugs and radially inwardly of the radially outer surface of the lug. In a preferred embodiment, the flange yoke includes a balance pad under the lug in which the balance hole is drilled. The drill hole may extend completely through the flange and into the lug. The present invention is particularly adaptable to flange yokes constructed of cast iron.

DETAILED DESCRIPTION OF A PREFERRED EMBODIMENT

Figure 1:
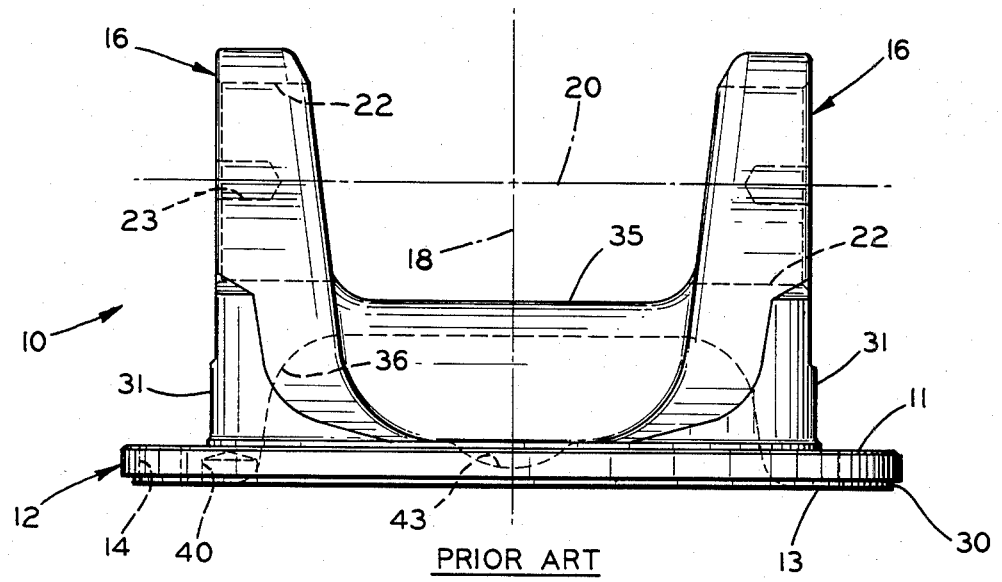
FIG. 1 is an elevation view of a prior art flange yoke.
Figure 2:
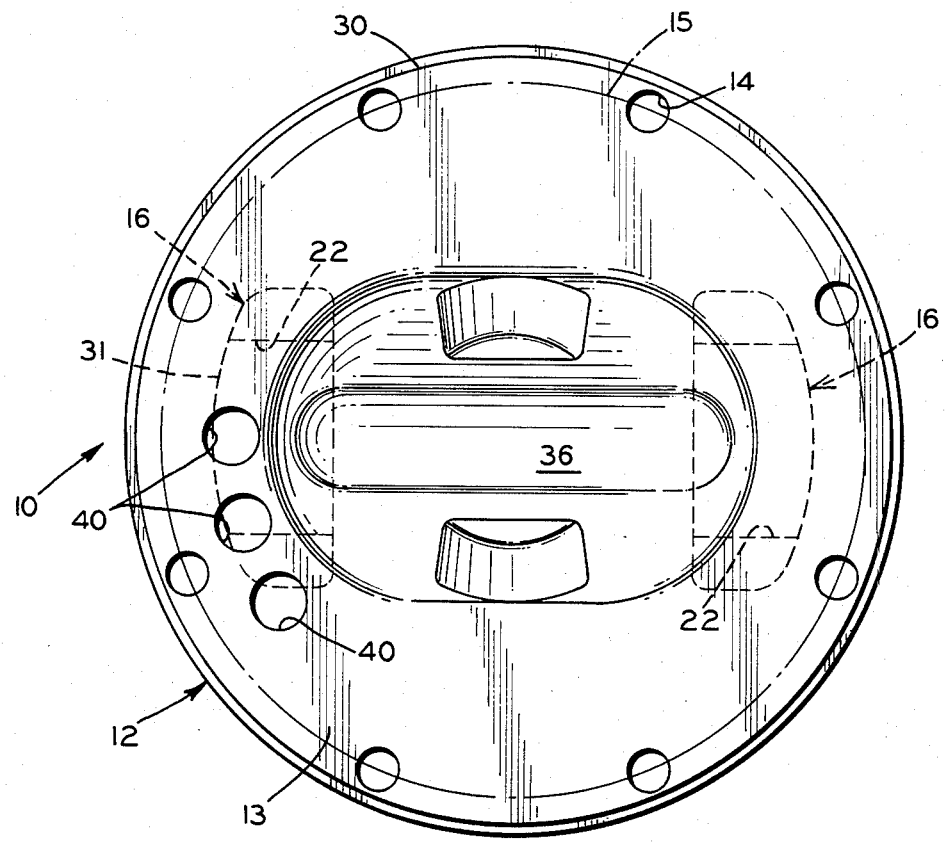
FIG. 2 is a view of the back face of the prior art flange yoke of FIG. 1.

To fully understand and appreciate the present invention, it is necessary to understand typical prior art devices. FIGS. 1 and 2 illustrate a typical prior art heavy duty forged steel flange yoke 10. The yoke 10 includes an annular flange shown generally at 12 having a front face 11 and a back face 13. The yoke 10 has a longitudinal axis 18 about which it is rotatable.

Extending generally perpendicularly from the front face 11 are two symmetrically and radially spaced lugs 16. Each lug contains a bearing cross bore 22 for receiving a journal cross trunnion. The external surface of each lug 16 contains tapped holes 23 for receiving cap screws which hold a bearing outer race.

Each lug 16 has a radially outer surface 31 adjacent the flange front face 11. The lugs are joined by a bridge 35 which provides torsional support for the lugs. The bridge 35 defines opposed notches 43 symmetrically spaced between the lugs 16 to allow maximum universal joint angles, as well known in the art.

Referring to FIG. 2, the back face 13 of the flange includes a one-sixteenth inch to one-eighth inch step which serves as a pilot ring 30 to center or pilot a mating companion flange, as is well known in the art. Pilot rings may be of any diameter sufficient to accommodate an appropriate companion flange. Companion flange mounting holes 14 are spaced circumferentially on a bolt hole circle 15. The holes 14 extend completely through the flange 12. The back face 13 includes a recess 36 underneath the bridge 35 for accommodating an output shaft mounting nut for mounting the companion flange to a transmission, or a pinion shaft mounting nut for mounting the companion flange to the pinion of an axle.

The back face 13 further includes balance holes 40, which are drill holes strategically positioned in the yoke to rotationally balance the yoke 10 about the axis 18. In the prior art, balance holes such as 40 were positioned radially outwardly as far as possible, and radially outwardly of the radially outermost lug surfaces 31. This was the common practice because the effectiveness of a balance hole increases geometrically with its distance away from the axis of rotation 18. It should be noted that the holes 40 are more shallow than the flange 12 to avoid passing completely therethrough and possibly structurally damaging the yoke. It was common in the prior art to drill several balance holes to remove enough weight to rotationally balance a yoke.

Figure 3:
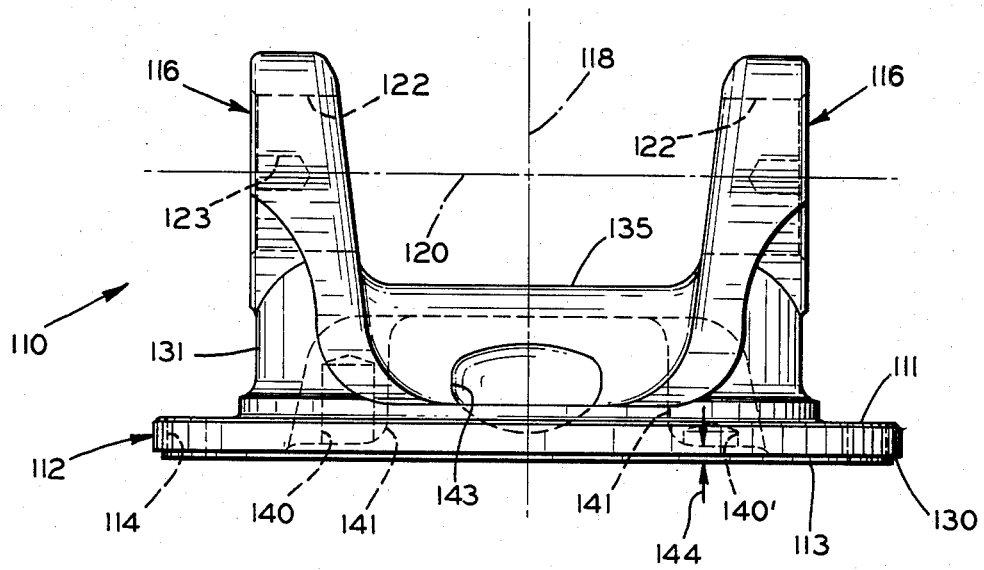
FIG. 3 is an elevation view of a flange yoke of the present invention.
Figure 4:
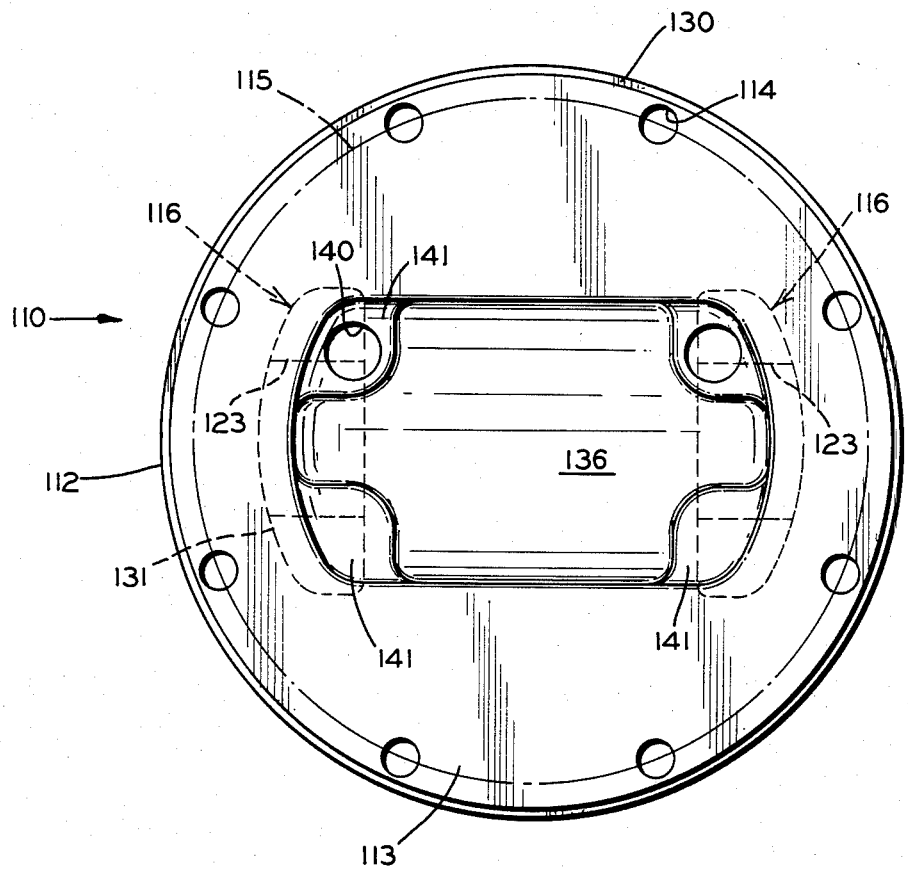
FIG. 4 is a view of the back face of the flange yoke of FIG. 3.

A preferred embodiment of the present invention is shown in FIGS. 3 and 4. Referring to FIG. 3, a cast iron flange yoke 110 includes an annular flange 112 having a front face 111 and a back face 113 and is rotatable about longitudinal axis 118. Yoke 110 includes two lugs 116 extending axially from the front face 111 and symetrically positioned about the axis 118. Each lug contains a bearing cross bore 122 and cap screw holes 123. The lugs 116 are thicker than the lugs of a typical forged steel yoke to provide additional torsional strength.

Each lug 116 has a radially outer surface 131 adjacent the flange front face 111. The lugs are joined by a bridge 135 which supports the lugs. The bridge 135 defines opposed notches 143, symetrically spaced between the lugs to allow maximum universal joint angles, as in the prior art.

Referring to FIG. 4, the flange back face 113 includes a pilot ring 130. Mounting holes 114 are positioned adjacent to the outer periphery of the flange and are centered on a bolt hole circle 115. The back face 113 includes a recess 136 underneath the bridge 135 for accommodating an output shaft or pinion shaft mounting nut.

The back face 113 includes four balancing pads 141 which are positioned generally at the corners of the elliptically shaped recess 136. Each pad 141 is sunken into the recess 136 a distance 144 of about one-eighth inch from the axially outermost surface of the back face 113 (see FIG. 3). Each pad is visibly distinguishable which permits quick location of the proper drilling points. Each pad 141 is generally underneath one side of each lug 116, and extends axially to blend with its associated lug, and is thereby generally indistinguishable from the lug at the interface region.

Balance hole 140 is drilled strategically in one of the balancing pads 141 to rotationally balance the yoke 110 about the axis 118. A second balance hole 140' may be drilled in another pad 141 if the heavy portion of the yoke is between the pads 141. The holes 140 and 140' may be of differing sizes or depths if the heavy spot is not halfway between two pads 141.

It will be noted that, in contrast to prior art devices such as shown in FIGS. 1 and 2, balance holes 140 are positioned radially inwardly of the radially outer most lugs surfaces 131. This concept is contrary to orthodox thinking in the prior art because the balance holes 140 are positoned closer to the axis of rotation 118, and therefore will be less effective than balance holes of similar size located more radially outwardly. The radially outer periphery of each balance hole is spaced from the lug surface 131 a distance equal to or greater than the balance hole radius to provide sufficient material to maintain the structural integrity of the yoke.

The primary advantage of the present invention is that the balance holes such as 140 may be much more deep than was possible in the prior art. Referring back to FIG. 3 it can be seen that hole 140 extends completely through the flange 112 and into the lug 116. These deep drill holes may be provided without structurally damaging the yoke, including the lugs 116.

Figure 5:
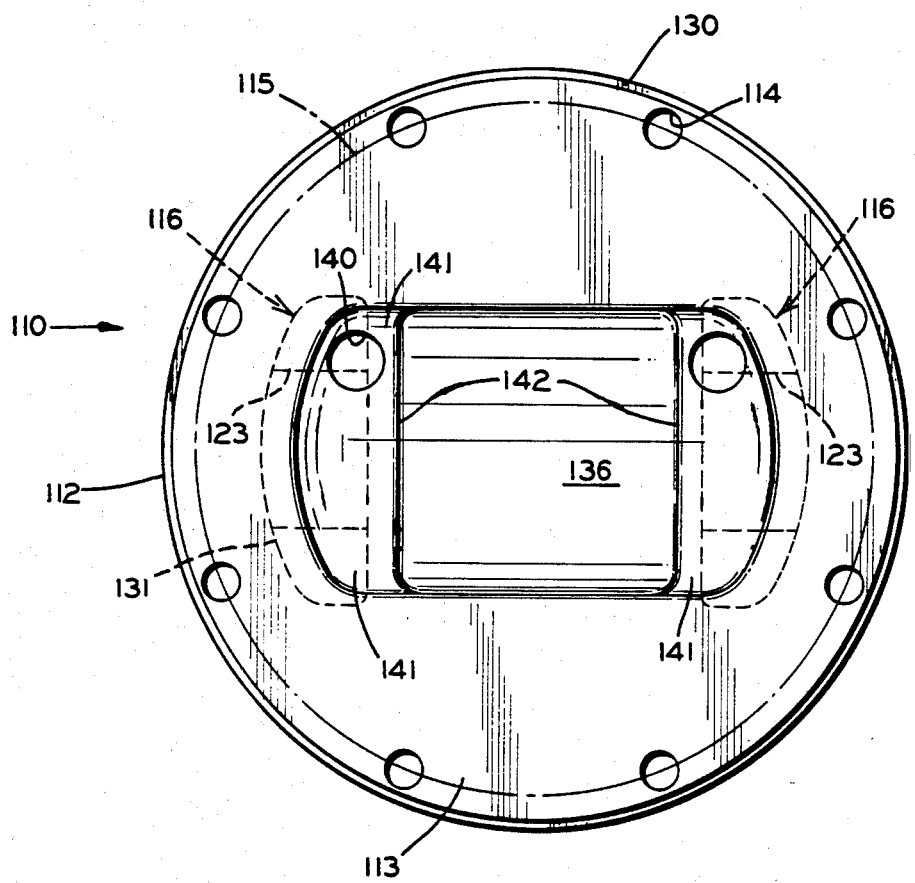
FIG 5 is a view of the back face of an alternative version of the flange yoke of the present invention.

Alternatively, two balance pads 142 may be provided, one generally underneath each lug 116, as is shown in FIG. 5. The basic difference between the pads 142 and 141 is the center section underneath the bearing cross hole 122 and between each set of pads 141. If the larger balancing pads 142 are used, care must be taken when drilling balance holes in the center section of the pads 142 to avoid extremely deep balance holes which would extend to the bearing cross hole 122.

The present invention more readily allows the substitution of cast iron for the yoke 10 in place of forged steel. While the cast iron yoke 110 is about 10% more massive than prior art forged steel yokes, its weight is no greater than forged steel yokes because the specific gravity of cast iron is about 90% that of forged steel. The cast iron weighs approximately 0.256 pounds per cubic inch, while forged steel weighs approximately 0.283 pounds per cubic inch.

The cast iron material used for yoke 110 is a pearlitic modular (ductile) iron used as cast (SAE materials specification D7003 [modified]). The cast iron has a tensile strength of 100,000 PSI and a yield strength of 70,000 PSI. Its elongation factor in 2 inches is 3-5% and its elastic modulus is $22-24 \times 10^6$ PSI The material has a Rockwell hardness of C20-30 and a Brinell hardness of 229 285 BHN. The cast iron is sufficiently hard for machining.

Modifications of the above described preferred embodiments may be possible without departing from the scope of the invention as defined in the following claims.

What is claimed is:

1. A flange yoke comprising:
   an annular flange having front and back faces, an axis of rotation, and a bolt circle about said axis of rotation on which is spaced a plurality of bolt holes;
   two lugs extending axially from said front face and symmetrically positioned about said axis, each of said lugs having radially inner and outer surfaces, and each of said lugs defining a bearing cross hole extending therethrough transversely to said axis between the respective radially inner and outer surfaces of each of said lugs, said bearing cross holes being aligned;
   said back face having a centrally located relief for receiving a mounting nut, said back face further having a pilot ring about said axis and surrounding said relief for positioning a companion flange;
   a balance pad positioned within said relief and generally underneath one of said lugs, the axially outermost surface of said balance pad being recessed axially inwardly into said relief with respect to the surface of said back face adjacent said relief;
   a balance hole positioned in said balance pad generally underneath one of said lugs, entirely radially inwardly of said radially outer surface of said one lug, at least partially radially inwardly of said radially inner surface of said one lug, and radially inwardly from said pilot ring.

2. The flange yoke as defined in claim 1 wherein the radial distance between the radially outer periphery of said balance hole and said radially outer surface of said one lug is equal to or greater than the radius of said balance hole.

3. A flange yoke as defined in claim 1 wherein said balance hole extends axially through said flange and into said lug.

4. A flange yoke as defined in claim 1 wherein said back face comprises two balance pads under at least one of said lugs, said balance pads under said at least one of said lugs spaced with respect to each other underneath opposite sides of the bearing cross hole of said at least one lug.

5. A flange yoke as defined in claim 1 wherein said balance pad has a cross sectional area substantially equal to the cross sectional area of said one lug.

6. A flange yoke as defined in claims 1, 2, 3, 4, or 5, wherein said flange yoke is constructed of cast iron.

* * * * *